(12) United States Patent
Zinniel et al.

(10) Patent No.: US 11,104,058 B2
(45) Date of Patent: Aug. 31, 2021

(54) SYSTEM AND METHOD FOR 3D PRINTING WITH METAL FILAMENT MATERIALS

(71) Applicant: Stratasys, Inc., Eden Prairie, MN (US)

(72) Inventors: Robert L. Zinniel, Plymouth, MN (US); S. Scott Crump, Wayzata, MN (US); Dominic F. Mannella, Minnetonka, MN (US)

(73) Assignee: Stratasys, Inc., Eden Prairie, MN (US)

( * ) Notice: Subject to any disclaimer, the term of this patent is extended or adjusted under 35 U.S.C. 154(b) by 423 days.

(21) Appl. No.: 15/994,584

(22) Filed: May 31, 2018

(65) Prior Publication Data

US 2018/0345573 A1    Dec. 6, 2018

Related U.S. Application Data

(60) Provisional application No. 62/513,152, filed on May 31, 2017.

(51) Int. Cl.
*B29C 64/118* (2017.01)
*B21C 33/02* (2006.01)
(Continued)

(52) U.S. Cl.
CPC ............ *B29C 64/118* (2017.08); *B21C 33/02* (2013.01); *B29C 48/92* (2019.02); *B29C 64/124* (2017.08);
(Continued)

(58) Field of Classification Search
CPC ... B29C 64/106; B29C 64/118; B29C 64/124; B29C 64/40; B33Y 10/00; B21C 33/02
See application file for complete search history.

(56) References Cited

U.S. PATENT DOCUMENTS

| | | | |
|---|---|---|---|
| 5,121,329 A * | 6/1992 | Crump | G05B 19/4099 700/119 |
| 5,746,844 A * | 5/1998 | Sterett | B29C 41/36 148/522 |
| 6,547,995 B1 | 4/2003 | Comb | |
| 6,722,872 B1 | 4/2004 | Swanson et al. | |

(Continued)

FOREIGN PATENT DOCUMENTS

| EP | 3326789 A1 | 5/2018 |
|---|---|---|
| WO | WO 2016/049642 | * 3/2016 |

*Primary Examiner* — Elizabeth A Burkhart
(74) *Attorney, Agent, or Firm* — Peter J. Ims; Westman, Champlin & Koehler, P.A.

(57) ABSTRACT

An additive manufacturing system configured to a 3D print using a metal wire material includes a drive mechanism configured to feed the metal feedstock into an inlet tube and a liquefier. The liquefier has a chamber configured to accept the metal feedstock from the inlet tube. The metal feed stock is heated in the chamber such that a melt pool is formed in the chamber. The liquefier has an extrusion tube in fluid communication with the chamber, the extrusion tube having a length (L) and a diameter (D) wherein the ratio of length to diameter (L/D) ranges from about 4:1 to about 20:1. The system has a platen with a surface configured to accept melted material from the liquefier, wherein the platen and the liquefier move in at least three dimensions relative to each other. The system includes a regulated source of pressurized inert gas flowably coupled to the liquefier and configured to place a controlled positive pressure onto the melt pool sufficient to overcome the resistance of the extrusion tube such that a part may be formed by the extrusion of the liquidus metal along toolpaths defined by the relative motion of the liquefier and the platen.

16 Claims, 13 Drawing Sheets

(51) Int. Cl.
*B33Y 10/00* (2015.01)
*B29C 64/124* (2017.01)
*B29C 64/40* (2017.01)
*B33Y 30/00* (2015.01)
*B29C 64/295* (2017.01)
*B29C 48/92* (2019.01)
*B29C 64/20* (2017.01)

(52) U.S. Cl.
CPC ............ *B29C 64/20* (2017.08); *B29C 64/295* (2017.08); *B29C 64/40* (2017.08); *B33Y 10/00* (2014.12); *B33Y 30/00* (2014.12); *B29C 2948/9258* (2019.02); *B29C 2948/92571* (2019.02); *B29C 2948/92904* (2019.02)

(56) References Cited

U.S. PATENT DOCUMENTS

| | | | |
|---|---|---|---|
| 7,942,987 B2 | 5/2011 | Crump et al. | |
| 9,027,378 B2 | 5/2015 | Crump et al. | |
| 9,108,360 B2 | 8/2015 | Comb et al. | |
| 2009/0314391 A1* | 12/2009 | Crump | B21C 33/02 |
| | | | 148/523 |
| 2011/0232855 A1 | 9/2011 | Crump et al. | |
| 2013/0287934 A1* | 10/2013 | Ramsundar | B22F 3/1055 |
| | | | 427/9 |
| 2015/0041025 A1* | 2/2015 | Wescott | B23K 26/0622 |
| | | | 148/538 |
| 2017/0087632 A1 | 3/2017 | Mark | |
| 2017/0129170 A1* | 5/2017 | Kim | B33Y 10/00 |

\* cited by examiner

SYSTEM AND METHOD FOR 3D PRINTING WITH METAL FILAMENT MATERIALS

CROSS REFERENCE TO RELATED APPLICATION(S)

The present application claims the benefit of U.S. Provisional Patent Application Ser. No. 62/513,152 entitled SYSTEM AND METHOD FOR BUILDING THREE-DIMENSIONAL OBJECTS WITH METALS AND METAL ALLOYS that was filed on May 31, 2017, the contents of which is incorporated by reference in its entirety.

BACKGROUND

The present disclosure relates to systems and methods for building three-dimensional (3D) metal parts in additive manufacturing systems. In particular, the present disclosure relates to extrusion-based additive manufacturing systems for printing 3D parts using metal materials.

Additive manufacturing, also called 3D printing, is generally a process in which a three-dimensional (3D) part is built by adding material to form the part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, jetting, laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along toolpaths at a controlled extrusion rate. The extruded continuous flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is melted. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and based only on the feed rate of filament into the liquefier, and the filament is advanced at a feed rate calculated to achieve a targeted extrusion rate, such as is disclosed in Comb U.S. Pat. No. 6,547,995. The printing operation is thus dependent on a predictable and controlled advancement of filament into the liquefier at a feed rate that will extrude material at the targeted rate; because the viscosity of the melted resin is high enough, it does not drip out of the extruder tip even though the exit is unrestricted with a valve or other throttling means.

Extrusion of metals and metal alloys poses challenges for traditional extrusion-based additive manufacturing equipment/techniques. Due to the low viscosity of molten metals as compared to molten thermoplastics, the flow of metal from a print head exit is not readily controllable solely by feeding of filament, as is done in a typical thermoplastic extrusion-based 3D printer. Furthermore, heating a metal above its liquidus temperature may cause dendrite formation in the print head, resulting in clogging of the liquefier and nozzle tip. Prior art methods of metal extrusion 3D printing include utilizing a freeze valve to start and stop extrusion, such as is disclosed in Crump et al. U.S. Pat. Nos. 7,942,987 and 9,027,378; and employing a pressure oscillator to jet droplets of liquidus metal from a liquefier, such as is disclosed in US2017/0087632. Thus, there is an ongoing need for systems and methods for building 3D objects from metals and metal alloys with extrusion-based additive manufacturing techniques.

SUMMARY

The present disclosure is directed to an additive manufacturing system configured to 3D print a part from a metal material. The system includes an inlet tube for conveying a metal feedstock in wire form to a liquefier. The liquefier has a chamber configured to accept the metal feedstock from the inlet tube at an upstream end thereof and to accumulate melted metal feedstock as a melt pool in a downstream end thereof and an extrusion tube in fluid communication with the chamber. The extrusion tube has a length (L) and a diameter (D) and terminating in an extrusion tip, wherein the ratio of length to diameter (L/D) ranges from about 4:1 to about 20:1, and wherein the L/D ratio is selected to resist a flow of liquidus metal from the melt pool through the extrusion tube at atmospheric pressure. A heater is configured to impart heat into the chamber and the extrusion tube, and wherein the heat causes the metal feedstock in the chamber to melt and form the melt pool. The system includes a drive mechanism configured to feed the metal feedstock through the inlet tube and into the liquefier at a controlled rate and a platen having a surface configured to accept melted material from the liquefier, wherein the platen and the liquefier move in at least three dimensions relative to each other. The system includes a regulated source of pressurized inert gas flowably coupled to the liquefier and configured to place a controlled positive pressure onto the melt pool. The positive pressure is sufficient to overcome the resistance of the extrusion tube such that liquidus metal will flow from chamber through the extrusion tip and onto the platen in a continuous extrusion stream such that a part may be formed by the extrusion of the liquidus metal along toolpaths defined by the relative motion of the liquefier and the platen and without use of further flow control mechanisms.

Another aspect of the present disclosure includes method of printing a 3D part from a metal filament material utilizing an additive manufacturing system. The method includes providing a build platen and a liquefier having a chamber flowably coupled to an extrusion tube terminating in an extrusion tip, the extrusion tube characterized by an L/D ratio ranging from about 4:1 to about 20:1, where L is its land length and D is its diameter. The method includes feeding a metal wire along a material feed path from a supply to the liquefier and heating the metal wire in the liquefier to form a melt pool of molten metal in the chamber.

The molten metal has a viscosity, and wherein a resistance or back pressure created by the extrusion tube contains the melt pool in the chamber. The method includes pressurizing the chamber with an inert gas to a controlled positive pressure sufficient to force the molten metal material from the melt pool through the extrusion tube by overcoming the resistance created by the extrusion tube and moving the build platen and the liquefier relative to each other along toolpaths generated from a digital model while maintaining the positive pressure in the chamber and feeding the metal wire to the liquefier, such that liquidus metal will flow through the extrusion tip and onto the platen in a continuous extrusion stream such that a part may be formed by the extrusion of the liquidus metal along the toolpaths.

DEFINITIONS

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful and is not intended to exclude other embodiments from the scope of the present disclosure.

Directional orientations such as "above", "below", "top", "bottom", and the like are made with reference to a layer-printing direction of a part. In the embodiments shown below, the layer-printing direction is the upward direction along the vertical z-axis. In these embodiments, the terms "above", "below", "top", "bottom", and the like are based on the vertical z-axis. However, in embodiments in which the layers of parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

The term "metal", "metals" or "metal materials", as used herein, are intended to include materials that are pure elemental metals and/or metal alloy blends.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
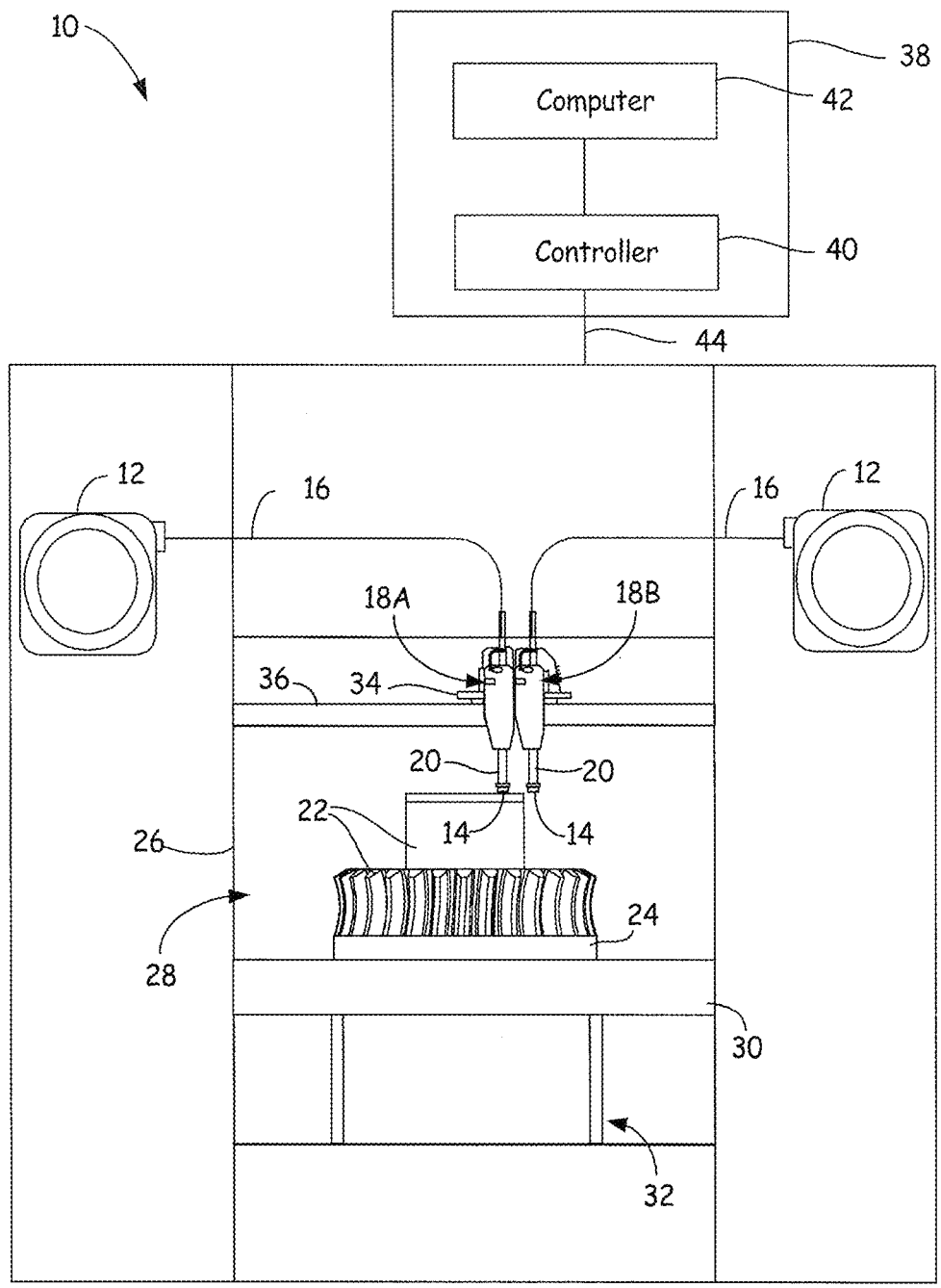
FIG. 1 is a front view of an additive manufacturing system for building 3D objects from metal filament materials.

FIG. 1 is a front perspective view of system 10, which is an exemplary additive manufacturing system for 3D printing of metal parts from metal filament materials. System 10 is provided for illustrative purposes, and disclosed embodiments are not limited to use with system 10. FIG. 1 illustrates a 3D printer 10 that has a substantially horizontal print plane where the part being printed is indexed in a substantially vertical direction as the part is printed by material extrusion in a layer-by-layer manner using at least one print head. For example, in FIG. 1, 3D printer 10 includes two print heads 18A, 18B and two consumable assemblies 12. Consumable assembly 12 supplying print head 18A retains a supply of a consumable metal or metal alloy wire for printing with system 10, and consumable assembly 12 supplying print head 18B typically retains a supply of support material but may alternatively retain a secondary part material. While two consumable assemblies and two print heads are shown, only one consumable assembly and print head are necessary.

Figure 2:
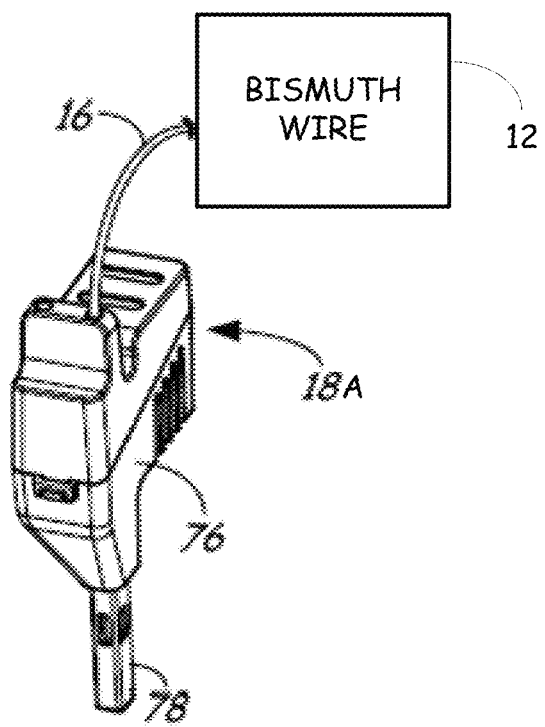
FIG. 2 is a diagrammatic illustration of a print head configured for extruding liquefied low-temperature metal wire, for example, bismuth-based wire, which may be employed with the additive manufacturing system of FIG. 1.

Print head 18A is an exemplary print head for melting and extruding filaments to print metal parts. As shown in FIG. 2, an exemplary embodiment of print head 18A is an easily loadable, removable and replaceable device comprising a housing that retains a liquefier assembly 20 having an extrusion tip 14. Print head 18A is configured to receive a low-temperature metal consumable filament material, melt the material in liquefier assembly 20 to produce a molten material, and deposit the molten material from an extrusion tip 14 of liquefier assembly 20, in a similar manner as is done in plastic extrusion. In the shown exemplary embodiment, the filament material used is bismuth or bismuth-based wire such as a bismuth-telluride compound, and liquefier assembly 20 melts the bismuth, bismuth alloy or bismuth-based compound for extrusion-based metal printing. With metal materials having relatively low-temperature melting points, aspects of conventional 3D printing equipment can be utilized, with modification. Higher melting temperature metals can be used as well, with additional hardware accommodations. In alternate embodiments discussed below, other metals are utilized, such as, aluminum, aluminum compounds and/or aluminum alloys.

Figure 3:
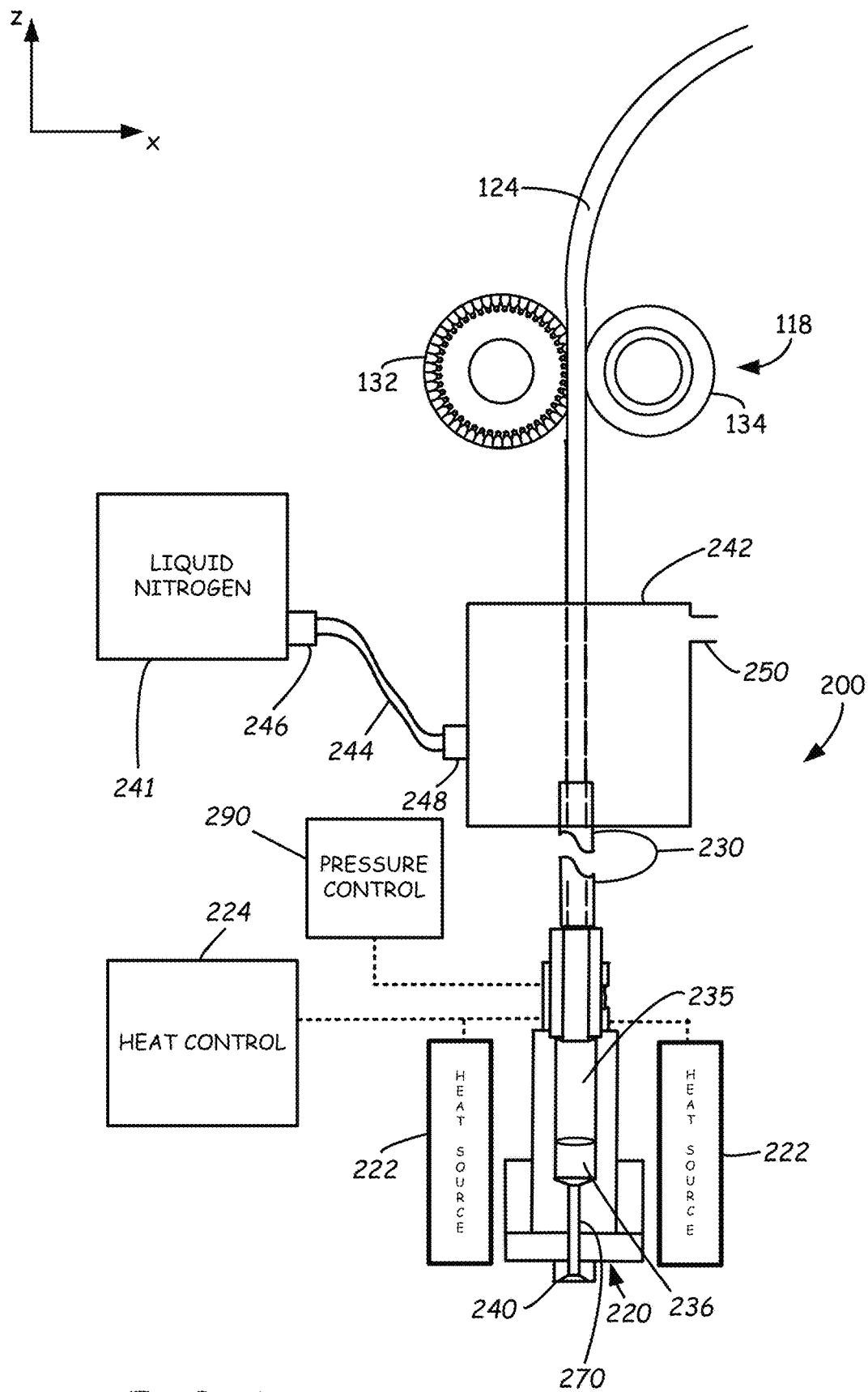
FIG. 3 is a diagrammatic illustration of a print head for building 3D objects using metal filament materials which may be employed with the additive manufacturing system of FIG. 1, and including a cryogenic based wire cooling system for pre-cooling the metal wire.

Guide tube or feed tube 16 (also shown in FIG. 2) interconnects each consumable assembly 12 and the respective print head 18A or 18B, where a drive mechanism 118 (as shown in FIG. 3) of print head 18A or 18B (or of 3D printer 10) draws consumable filament from consumable assembly 12, through guide tube or feed tube 16, to liquefier assembly 20 of print head 18A or 18B. Guide or feed tube 16 may be a component of 3D printer 10, or a sub-component of consumable assemblies 12. During a build operation, the continuous consumable filament is driven into print head 18A or 18B are heated and melted in the liquefier assembly 20. The continuous bead of molten material is extruded through extrusion tip 14 in a layer wise pattern to produce printed parts.

In some embodiments, such as using the exemplary print head of FIG. 2, the wire is typically driven into the liquefier at a rate equivalent to the desired exit or deposition rate where the feed rate is directly proportional to the deposition rate. In other embodiments, a melt pool of liquid or molten metal wire is formed within the liquefier and using pressure-control techniques as described below with reference to FIGS. 3 and 4, the liquefied metal is selectively extruded through the extrusion tip at a rate independent of the feed rate, but the extrusion is still coordinated the filament feed rate.

Exemplary 3D printer 10 is an additive manufacturing system for 3D printing parts or models using a layer-based, additive manufacturing technique, similar to fused deposition modeling systems sold by Stratasys, Inc., Eden Prairie, Minn. under the trademark "FDM," but with the capability for printing metals As shown, 3D printer 10 includes system casing 26, build chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive consumable assemblies 12. In alternative embodiments, the container bays may be omitted to reduce the overall footprint of 3D printer 10. In these embodiments, consumable assembly 12 may stand proximate to system casing 26, while providing sufficient ranges of movement for guide or feed tubes 16 and print heads 18 that are shown schematically in FIG. 1.

Build chamber 28 may be an enclosed, inerted environment that contains platen 30 for 3D printing part 22 and support structure 24. Build chamber 28 may be heated (e.g., with circulating heated air) to reduce the rate at which the part and support materials solidify after being extruded and deposited (e.g., to reduce distortions and curling). In alternative embodiments, build chamber 28 may be omitted and/or replaced with different types of build environments. For example, part 22 and optional support structure 24 may be built in a build environment that is open to ambient conditions or may be enclosed with alternative structures (e.g., flexible curtains). Alternatively, the liquefier assembly may be locally inerted in an otherwise ambient build chamber. Platen 30 is a platform on which part 22 and support structure 24 are printed and is supported by platen gantry 32. In the illustrated embodiment, platen gantry 32 is a gantry assembly configured to move platen 30 along (or substantially along) the vertical z-axis.

In some alternative embodiments, platen 30 can be heated or otherwise temperature controlled, thus conducting heat up through the printed part, to influence metal resolidification and crystal structure. As the metals/alloys (e.g., aluminum) used are heat conductive, heating platen 30 can be effective at controlling the solidification rate of the parts and/or support materials. Using a heated platen, the build environment (e.g., build chamber 28) may also be heated, but likely to a lesser degree. Heating platen 30 aids in heat conduction of the metal material, without requiring a build environment furnace to bring the environment to such a high temperature. For example, in the case of aluminum, aluminum-based alloys and/or aluminum-based compounds, gasses in the build envelope environment could be heated and circulated at about 300° C. while the platen is heated to about 600° C.

Head carriage 34 is a unit configured to receive and retain one or both print heads 18A and 18B and is supported by head gantry 36. Head carriage 34 preferably retains each print head 18A and 18B in a manner that prevents or restricts movement of the print head 18 relative to head carriage 34 so that extrusion tip 14 remains in the x-y build plane but allows extrusion tip 14 of the print head 18 to be controllably moved out of the x-y build plane through movement of at least a portion of the head carriage 34 relative the x-y build plane (e.g., servoed, toggled, or otherwise switched in a pivoting manner).

In the shown embodiment, head gantry 36 is a mechanism configured to move head carriage 34 (and the retained print heads 18A and 18B) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for build chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plan, and head carriage 34 (and print heads 18A and 18B) may be configured to move along the z-axis. Other similar arrangements may also be used such that one or both of platen 30 and print heads 18A and 18B are moveable relative to each other.

3D printer 10 also includes control system 38, which may include one or more control circuits (e.g., controller 40) and/or one or more host computers (e.g., computer 42) configured to monitor and operate the components of 3D printer 10. For example, one or more of the control functions performed by control system 38, such as performing move compiler functions, can be implemented in hardware, software, firmware, and the like, or a combination thereof; and may include computer-based hardware, such as data storage devices, processors, memory modules, and the like, which may be external and/or internal to 3D printer 10.

Control system 38 may communicate over communication line 44 with print heads 18A and 18B, with environmental controls for chamber 28, head carriage 34, motors for platen gantry 32 and head gantry 36, and various sensors, calibration devices, display devices, and/or user input devices. In some embodiments, control system 38 may also communicate with one or more of platen 30, platen gantry 32, head gantry 36, and any other suitable component of 3D printer 10, some of which are described below in greater detail. While illustrated as a single signal line, communication line 44 may include one or more electrical, optical, and/or wireless signal lines, which may be external and/or internal to 3D printer 10, allowing control system 38 to communicate with various components of 3D printer 10.

During operation, control system 38 may direct platen gantry 32 to move platen 30 to a predetermined height within build chamber 28. Control system 38 may then direct head gantry 36 to move head carriage 34 (and the retained print heads 18A and 18B) around in the x-y build plane above build chamber 28. Control system 38 may also direct print heads 18A and 18B to selectively draw successive segments of the consumable wire or filament from consumable assemblies 12 and through guide or feed tubes 16, respectively.

While FIG. 1 illustrates a 3D printer 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1. For instance, the print head can be stationary and the platen can move in the x, y and z directions. However, the present disclosure is not limited to layer-based additive manufacturing. The part can also be printed using 3D tool paths, such as by replacing head carriage with a robot arm and connecting the print head to a robot end effector.

Referring now to FIG. 3, shown are components of an exemplary print head 200A metal or metal-alloy wire 124 is shown being fed, from a consumable spool or other source (not shown), by a drive mechanism 118 having a drive roller 132 and an idler roller 134. The narrow metal wire 124 is fed into a liquefier assembly 220 having a chamber 235, where it is melted by heaters or heat sources 222 under the control of controller 224 and formed into a melt pool 236 of liquidus metal wire. Melt pool 236 forms within chamber 235 in fluid communication with an extrusion tube 270 of liquefier 220, so that it can be controllably extruded through extrusion tip 240 of extrusion tube 270. In the shown embodiment, the wire is melted in chamber 235, but alternative embodiments are contemplated where the wire could be melted in the liquefier upstream of chamber 235 to form a reservoir of molten metal. An inert gas head pressure is placed on the chamber 235 using pressure control 290 (discussed further with respect to FIG. 4), to create a force for deposition through extrusion tip 240 or extrusion tube 270 onto a build platen or surface as a continuous bead of molten metal. Using pressure-control techniques as described further below, the liquefied metal is selectively extruded through the extrusion tip at a rate independent of the feed rate, but in coordination with the feeding of wire filament. Wire 124 can be a variety of metal types. While the present disclosure references the use of an aluminum filament material, other materials such as bismuth, stainless steel or other commercially valuable materials such as titanium are also contemplated. In one embodiment, the metal wire 124 diameter is smaller than that of typical thermoplastic filament types, which is commonly 0.07". In the example of aluminum, a diameter of 0.032" was used. In the case of bismuth, 0.051" was used. However, these diameters are exemplary in nature and are non-limiting to the scope of the present disclosure.

The extrusion tube 270 is defined based on its land length and an L/D ratio. The land length is nominally the length of the extrusion tube 270 between a location where the flow channel is constricted after the melt pool, and an outlet of the extrusion tip 240. The extrusion tube 270 can be characterized by the ratio of its land length (L) to diameter D, where a higher ratio of L/D creates a higher back pressure and flow resistance, and therefore a higher inert gas head pressure is required to force liquidus metal through the extrusion tube 270 to create a continuous extrusion flow.

In order to prevent excessive heat from transferring up from liquefier assembly 220 and prematurely melting wire before it enters the liquefier, the wire 124 is fed through a ceramic inlet tube 230 prior to entering the heated liquefier zone. Optionally, the wire 124 can also be cryogenically pre-cooled prior to entering ceramic tube 230. Selecting a narrow diameter of wire will also minimize and reduce heat buildup in the inlet tube so as not to melt prior to entering the liquefier zone. As shown, a tank 241 of liquid nitrogen or other cooling fluid, can be optionally connected to a cooling chamber 242 by a conduit 244 and a pair of pressure valves 246 and 248. Controlling pressure valves 246 and 248, liquid nitrogen is output from tank 240 into conduit 244. Wire 124 passes through cooling chamber 242 and directly contacts the super cooled gas to cool the wire 124 prior to entering ceramic tube 230. This super cooling of wire 124 counteracts heat transfer from the liquefied metal within chamber 235 in an upward direction to the wire within ceramic tube 230.

Figure 4:
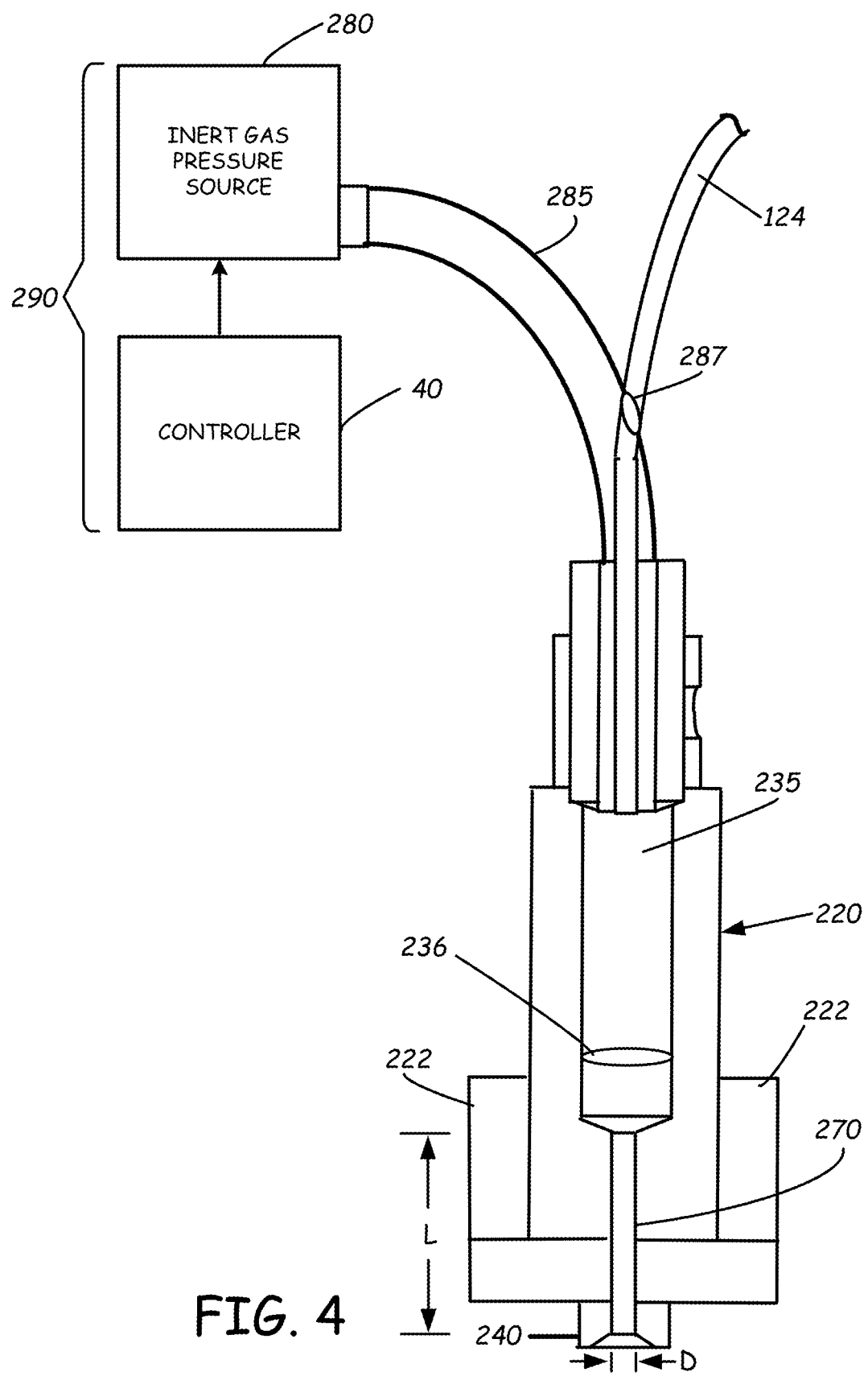
FIG. 4 is a diagrammatic illustration of a pressurized liquefier assembly of the present invention for use in providing a controlled extrusion of liquefied metal.

Referring now to FIG. 4, shown is one example embodiment of a method of using positive pressure to control the flow of liquefied metal from chamber 235 of liquefier assembly 220 through extrusion tube 270 and out of extrusion tip 240. As shown in FIG. 4, a source 280 of regulated inert gas, such as a regulated gas tank, can be connected by a tube or conduit 285 to liquefier assembly 220. In exemplary embodiments, the gas provided by pressure source 280 is an inert gas such as argon or nitrogen. While pressure source 280 is shown connected to liquefier assembly 220 directly by tube 285, it should be understood that such connection can also be through ceramic tube 230 and other conduits or pathways which are not shown in FIG. 4 for simplified illustrative purposes.

Wire 124 is shown in FIG. 4 piercing or entering tube or conduit 285 carrying a pressurized gas from source 280. From the point of entry into tube or conduit 285, wire 124 is fed interior to tube 285 and any other conduits or pathways into liquefier assembly 220 for melting by a heat source (not shown in FIG. 4), such as described above. In some embodiments, a seal such as an O-ring 287 can be used to seal the point of entry of wire 124 into tube or conduit 285. A controller 290 is used to control the pressure of gas flowing into tube or conduit 285 from source 280 creates pressure within tube 285 and liquefier assembly 220 and provides an assisting force to push liquid metal within chamber 235 into extrusion tube 270 and out of extrusion tip 240. In typical thermoplastic extrusion 3D printing, the high viscous fluid does not require a highly constrained flow path and many suitable channel dimensions are possible, to provide adequate flow through the extrusion tip. However, molten metal it is not viscous in comparison to thermoplastics, and the L/D ratio becomes much more important to controlling flow. In a typical thermoplastic liquefier operation, the feeding of filament determines the overall flow rate through the print head, and there is no pressure assist on the liquefier to assist with pumping. With molten metals, the overall printing rate is determined by the filament feed rate, but the melt reservoir 235 holds a small pool of material. The amount of material that exits liquefier assembly 220 is controlled by the rate of drainage of the relatively non-viscous material, but is also increased by controlling the pressure in the chamber 235. The extrusion of a liquefied metal from extrusion tip 240 can be controlled at a desired rate to deposit the liquefied metal material along toolpaths without the need for a control valve or other flow restriction at the extrusion tip/exit. Prior art solutions for non-viscous molten metal flow have required valving, freeze valves, pressurized droplet creation, or pumping to limit the flow to a desirable rate. This approach removes the need to control or restrict the flow rate.

By selecting or designing the liquefier assembly 220 to control the land length L of extrusion tube 270 relative to its diameter D between chamber 235 containing the liquefied metal and extrusion tip 240, in conjunction with controlling other forces such as provided by pressure source 280, improved control of the extrusion of the liquidus metal can be achieved. Overall, the feed rate of the exiting metal bead is influenced by the height of the melt pool 236 of liquid metal, the inert gas head pressure on the molten pool within the liquefier, and the balance of the surface tension of a particular molten metal, in conjunction with the selection of the land length L and diameter D of the extrusion tube 270. The longer the length, the more controllable the flow.

The level of inert gas head pressure (i.e., pressure in the chamber 235) that is needed to create a constant flow of liquidus metal out of the extrusion tip 240 can be estimated by calculating the back pressure exerted from the extrusion tube 270 and the extrusion tip 240 as a sum of the Laplace pressure at the tip and the pressure drop through the tube. Laplace pressure is the back pressure from the suspended droplet below a nozzle tip that tends to resist flow (until the hemispherical surface is distorted by contact with the part, or the droplet extends beyond a hemisphere). For a hemispherical surface of radius r and an alloy with a surface tension $\gamma$, the back pressure resisting the alloy is:

$2r/\gamma$.

For example, for an aluminum droplet having a surface tension of 0.86 newtons/meter and a 30 mil diameter tip face, the back pressure is 0.65 psi. The pressure rises as the tip size is reduced.

The pressure drop P for a flow Q through a cylindrical channel of radius R and length L (absent contaminants in the alloy) is from Poiseuille:

$$P = \frac{32Q\eta L}{\pi R^4}$$

Where $\eta$ is the alloy viscosity, which for many of the discussed alloys is roughly 0.5 centipoise. A 10 mil diameter extrusion tube that is 50 mils long and having a volumetric flow rate of 500 micro-cubic inches per second (mic/s) will have a viscous pressure drop of 0.09 psi along its land length.

Figure 16:
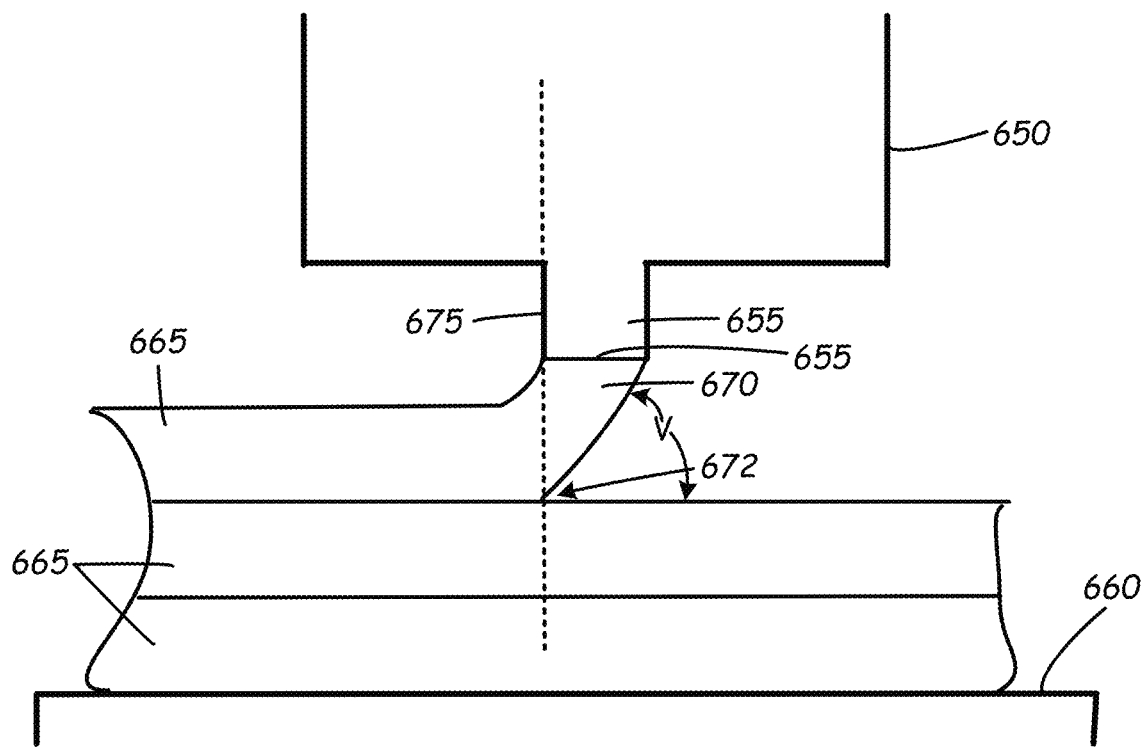
FIG. 16 is a diagrammatic illustration of a liquefier assembly printing a metal part in accordance with the present invention and showing an optimization feature.

In metal extrusion, when the pendant droplet contacts the part under construction, several things happen at once. First, surface tension no longer restrains the metal flow; in fact, the opposite happens. As long as the extrusion has a wetting contact angle with the part (such as is illustrated in FIG. 16), the liquidus metal will attempt to wick out over the surface of the part. Further, the (presumed solid) part build surface will quickly conduct heat from the molten metal, generally forming a peritectic slush between the part surface and the extrusion tip that does constrain the alloy flow. Additionally, the thermal sink of the part build surface puts a thermal load on the extrusion tip, which for a thermoelectrically controlled liquefier (e.g., temperature sensed at tip with a thermocouple or other mechanism and the heating energy is correspondingly controlled) prompts the controller to pour more energy into the tip, which in turn starts melting back the part build surface.

For a given length and diameter of the liquefier tube, the amount of flow restriction experienced for each particular viscosity of molten metal will vary. Likewise, the amount of back pressure on the liquidus metal melt pool 236 can be controlled by adjusting the land length of the extrusion tube 270. A typical range of the L/D ratio is between about 4:1 and about 20:1. Another typical range of the L/D ratio is between about 4:1 and about 10:1. For a selected L/D ration in this range, a continuous flow extrusion of liquidus metal through a print head can be controlled by applying a gas head pressure, and removing the pressure in combination with withdrawing the supply of filament to stop the flow, without employing additional mechanical means of flow restriction (such as a control valve or freeze valve). In a preferred embodiment, the extrusion tube diameter D was selected to be 0.012", with an extrusion tube length of 4 times that, or 0.048". In another embodiment, an extrusion tube diameter was selected at 0.016", and 0.020" in another device. As a larger diameter is selected, melt can begin to leak or drip out of the tip slightly, referred to as die drool. At L/D of 4:1, more drool will occur than at L/D of 10:1 or 20:1, but as the ratio increases, the more pressure must be applied to force the molten metal through the extrusion tube pathway outlet.

Example One

An aluminum alloy welding wire Alloy 3043 was selected for use, suitable for a filament feedstock for 3D printing, was purchased from AlcoTec Wire Corporation of Traverse City, Mich. The wire had a diameter of 0.035" and a melting temperature of 1065-1170 F. An extrusion tube was selected with a diameter of 0.012" and length of 0.048". The melt chamber was heated to 1110° F. to bring it to an optimal viscosity for deposition. Nitrogen at a pressure of 2-5 psig was applied to the liquefier to create flow, and to vary deposition amount/speed.

Figure 5:
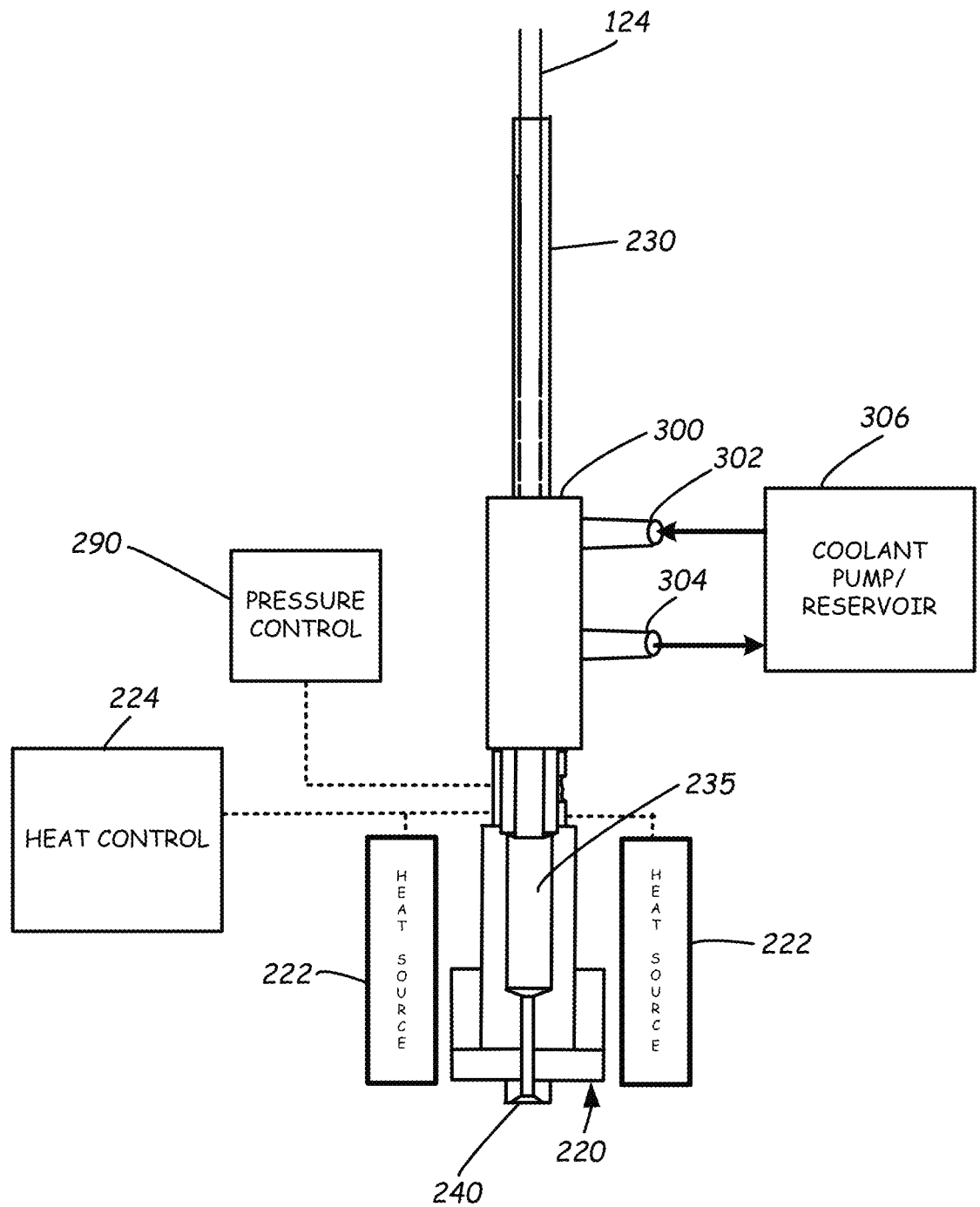
FIG. 5 is a diagrammatic illustration of a print head having a ceramic tube and a metal nozzle base and a heat transfer module for use in melting and pre-cooling the in-coming metal feed wire which may be employed with the additive manufacturing system of FIG. 1.

Referring next to FIG. 5, shown are certain exemplary components of an embodiment in which cooling is provided to limit heat transfer through metal or metal-alloy wire 124 upstream of liquefier assembly 220 and chamber 235. As shown in FIG. 5, in some exemplary embodiments, a heat transfer module or unit 300 is included and is jacketed about at least a portion of ceramic tube or conduit 230 through which wire 124 is fed instead of having the cooling medium directly contact the metal wire. The heat transfer unit 300 includes an inlet 302 and an outlet 304 coupled to a coolant pump/reservoir 306. The coolant from pump/reservoir 306 is pumped into inlet 302, through an interior chamber surrounding ceramic tube 230, and back out of outlet 304. By circulating the coolant into heat transfer unit 300, heat energy conducted by wire 124 and by ceramic tube 230 is transferred to the coolant, thereby preventing the temperature within ceramic tube 230 from increasing to the point that wire 124 begins to melt prior to entering liquefier assembly 220. While coolant pump/reservoir 306 is shown as a single unit, those who are skilled in the art will understand that coolant pump/reservoir 306 can include a separate reservoir or tank of coolant, and electric or other type of pump for pumping the coolant, and other mechanisms for dissipating the heat transferred to the coolant. The coolant can be any suitable medium including, but not limited to, liquid nitrogen, dry ice, cooling water, chilled cooling water, glycol-based liquids and dried or conditioned chilled air.

Figure 6:
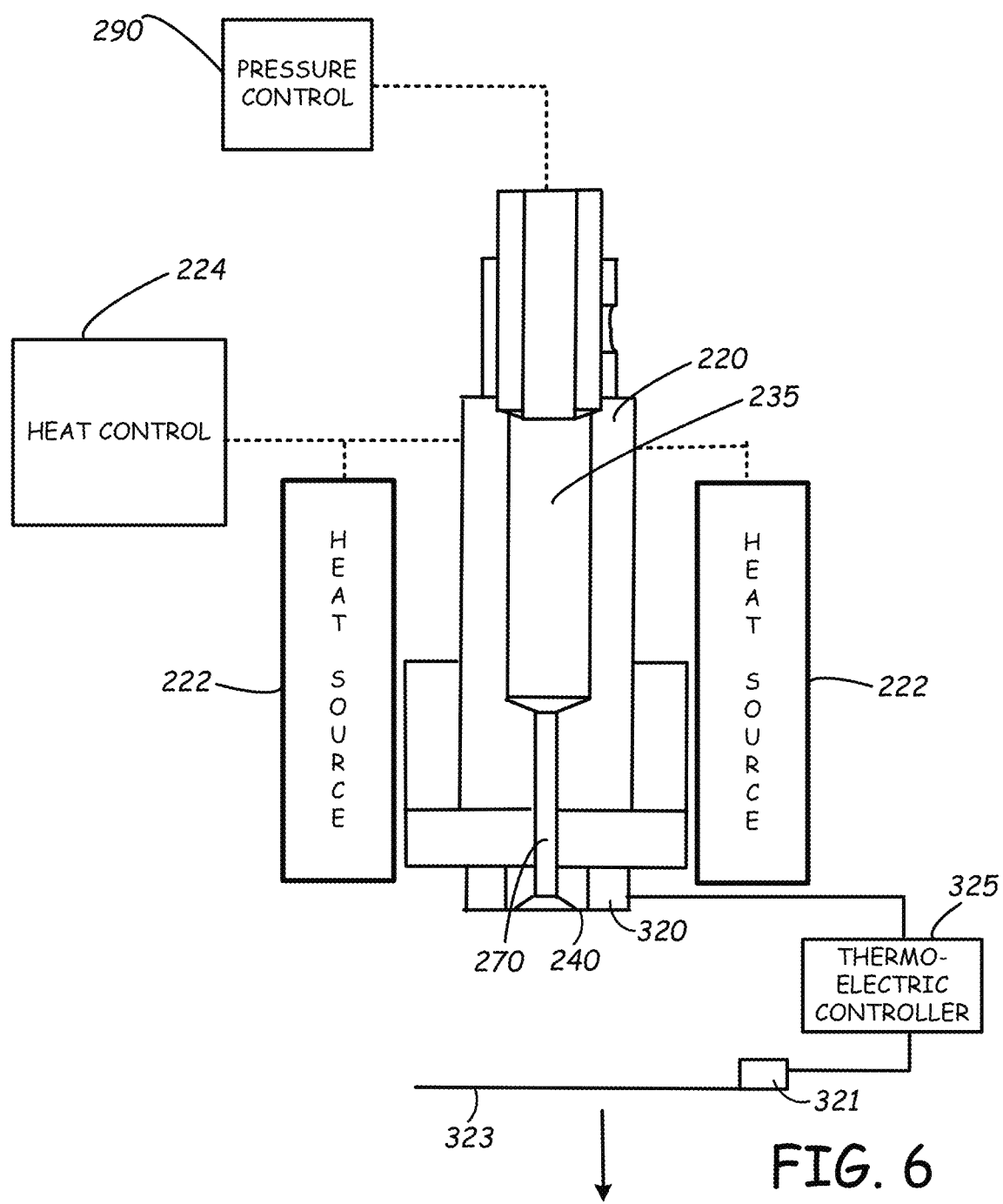
FIG. 6 is a diagrammatic illustration of a liquefier assembly including thermo-electric heating material and a thermo-electric controller for use in controlling the flow and viscosity of extruded liquefied metal.

Referring next to FIG. 6, shown are some exemplary components of a 3D printer, such as discussed above, as well as thermoelectric components configured to aid in the control of the extrusion of liquefied metal from extrusion tip 240. Using a thermoelectric electrode 320 proximate extrusion tip 240 and an electrode 321 on a build platen 323 a current or a voltage can be generated by a thermos-electric controller 325 in the liquid metal flowing from the extrusion tip 240 to the build platen 323 or from the build platen 323 to the extrusion tip 323 depending upon the effect desired on the liquid metal exiting the liquefier. For instance, heat energy can be added or removed from the liquefied metal flowing from chamber 235 and out of extrusion tip 240 depending on the direction of the flow of the electric current and/or the change in voltage. For example, using a bismuth-telluride material for thermoelectric material 320, and using the thermo-electric controller 325 to control the voltage differential across the thermoelectric material between the liquefier and the build platen, the electrodes 320, 321 can be used to heat or cool the liquid metal material. Using this technique, cooling or heating of the liquefied metal can be applied to increase or decrease the viscosity of the metal as it is being deposited. In exemplary embodiments, thermoelectric controller 325 and electrodes 320, 321 can be used both to aid in the control of flow of liquefied metal, and in aiding the extruded liquefied metal in returning to its solid state more quickly to improve the deposition process and the part being manufactured.

Figure 7:
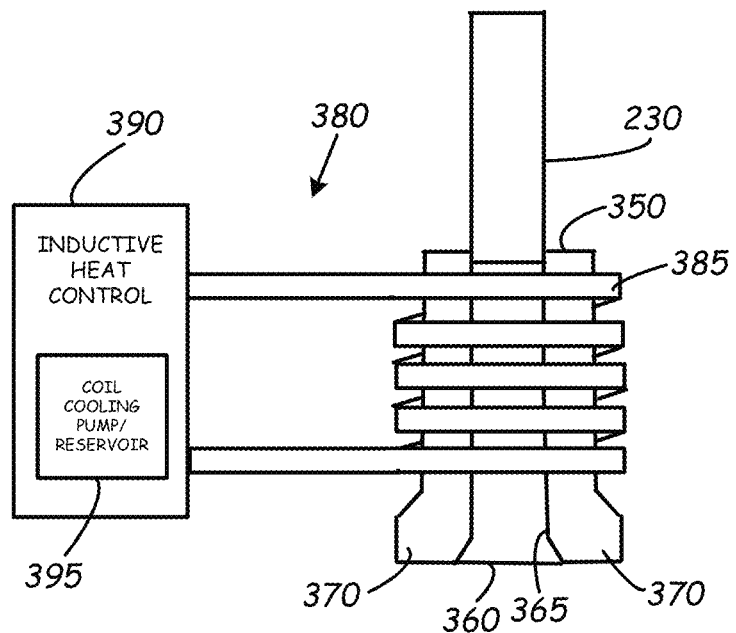
FIGS. 7 and 8 are diagrammatic illustrations of embodiments of liquefier inductive heat systems for melting metal wire for extrusion.
Figure 8:
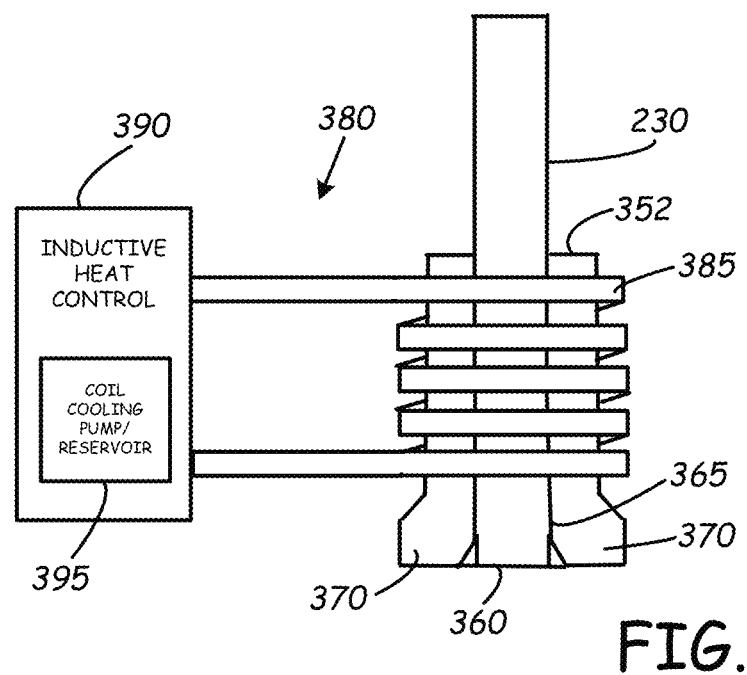

Referring now to FIGS. 7 and 8, shown are other exemplary liquefier assemblies 350 and 352, and an inductive heat system 380 which can be used as the heat source in some exemplary embodiments. Liquefier assemblies 350 and 352 shown respectively in FIGS. 7 and 8 differ only in that in liquefier assembly 352, ceramic tube 230 extends all the way through the liquefier assembly to extrusion tip 360, while in liquefier assembly 350, ceramic tube 230 does not. In each of liquefier assemblies 350 and 352, portions 370 which surround an extrusion tube 365 through which the metal wire or liquefied metal passes, are made from a ferrous metal or metal-alloy, such as carbon steel. Also, inductive heat system 380 includes an inductive coil 385 surrounding ferrous metal portions 370 of the liquefier assembly. Using an inductive heat controller 390, which includes an electronic oscillator to control an alternating current through the coil 385, the ferrous portions 370 of liquefiers 350 and 352 are heated by electromagnetic induction.

The inductive heat generated within portions 370 of the liquefier assemblies melts the wire (not shown in FIGS. 7 and 8) and allows deposition of the liquefied metal or metal-alloy through extrusion tip 360. Using an inductive heat system, temperatures are generated that are sufficient to melt high temperature metals, such as aluminum. As coils 385 of inductive heating system 380 can themselves become too hot for preferred use in a printer, in some embodiments, inductive heat control 390 can also include a coil cooling pump and reservoir 395. The coils 385 can then be in the form of metal tubes which have water or other coolants circulated through in order to remove excess heat from the coil.

Figure 9:
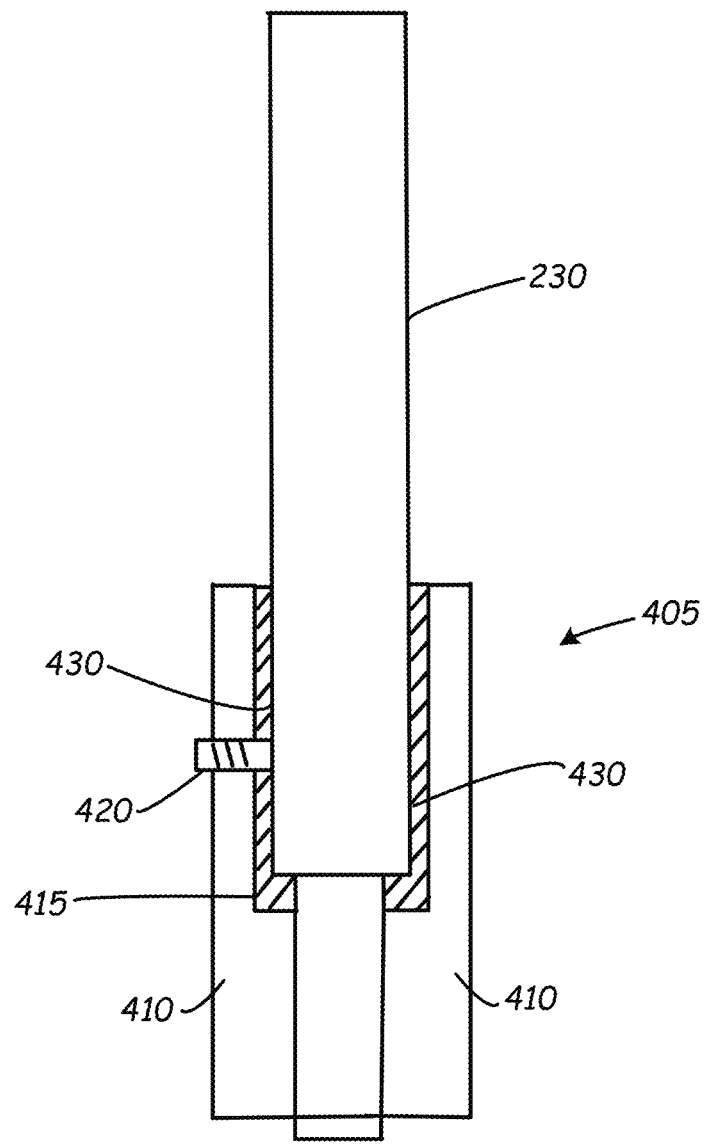
FIG. 9 is a diagrammatic illustration of a ceramic inlet tube and a metal base with a removable liquefier assembly, with retaining and sealing mechanisms.

Referring now to FIG. 9, shown are features of some example liquefier assemblies which allow connection and removal of the liquefier assembly from a ceramic tube. As shown in FIG. 9, a liquefier assembly 405 includes a metal base 410, which can be, for example, steel or titanium. The metal base 410 forms an inlet chamber 415 which is configured to receive ceramic tube 230. Once inserted into inlet chamber 415, a set screw 420 is used to secure the ceramic tube within the chamber and prevent its unintended removal from the chamber 415. In exemplary embodiments, a high temperature packing material 430 is positioned between ceramic tube 230 and metal base 410 of liquefier assembly 405 to provide a seal therebetween to prevent liquid metal from entering the seam and passing therethrough, especially when using a pressurized gas to control the extrusion of liquid metal from a liquefier as discussed above.

Figure 10:
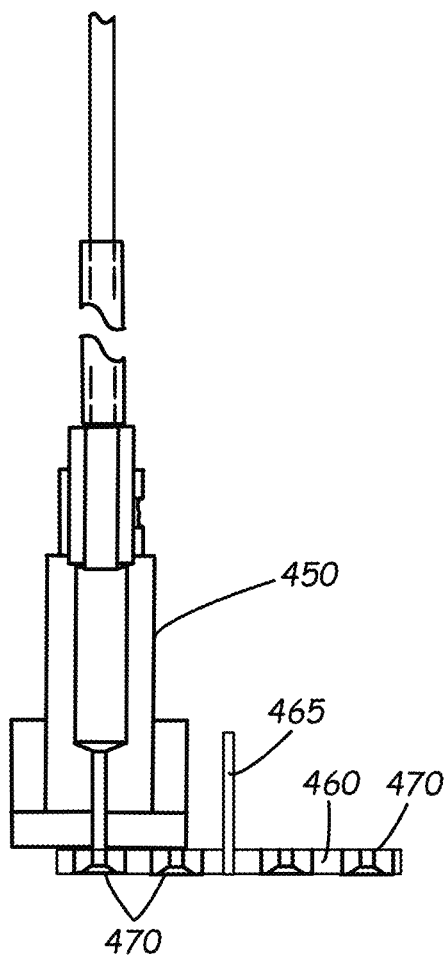
FIG. 10 is a diagrammatic illustration of a liquefier assembly and a cartridge of removable extrusion tips.

When extruding liquefied metals, one difficulty is that the liquefied metal can re-solidify, or build up dendrites of slag material, within the liquefier assembly, for example at the extrusion tip of the liquefier assembly. If the system lacks a heat source positioned to prevent resolidification of a metal near the extrusion tip or in the liquefier tube, the extrusion tip or tube can clog and prevent further printing. In addition to interrupting printing, this can require that the entire liquefier assembly be removed for repair or replacement. To address this difficulty, in some exemplary embodiments, disclosed liquefier assemblies include removable or replaceable extrusion tips which can be quickly changed if the liquefier assembly becomes clogged, or which can be changed periodically to prevent the liquefier from becoming clogged or overly worn. For example, as shown in FIG. 10, a liquefier assembly 450 is configured to utilize removable or replaceable extrusion tips 470. In one embodiment, a revolving or otherwise moveable cartridge 460 containing multiple extrusion tips 470 can be used to replace the extrusion tip on liquefier 450. In an exemplary embodiment, cartridge 460 rotates or revolves about an axis member 465 to position different extrusion tips 470 in position for use by liquefier assembly 450. In such a revolving cartridge configuration, the extrusion tips 470 would be concentrically located at equidistant positions from the axis member 465. In other embodiments, the cartridge 460 can be linearly moved to change extrusion tips 470. While not shown in FIG. 10, such a system may include actuators or an actuation system for rotating or otherwise moving cartridge 460 into place. Further, in some embodiments, extrusion tips 470 are disposable items that lock into place on liquefier assembly 450, for example using a cam locking mechanism. In such embodiments, the disposable liquefier tips 470 would not need to be disposed on a cartridge 460. They could, in some embodiments, be individually connected and removed from the liquefier assembly by an operator.

Figure 11:
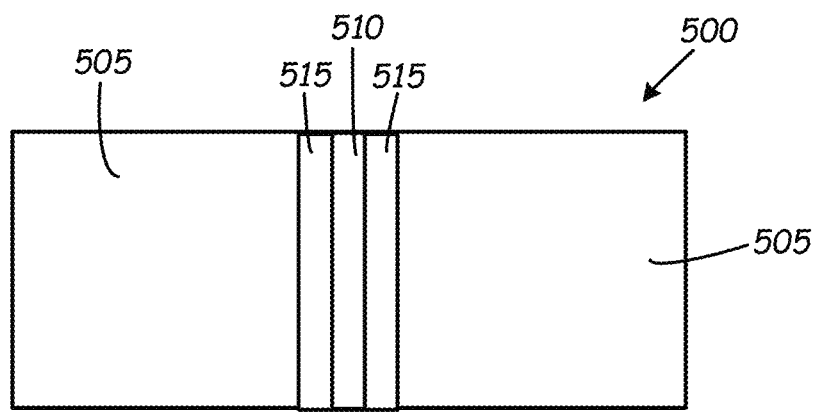
FIG. 11 is a diagrammatic illustration of a portion of a liquefier assembly of the present invention including a titanium insert.

Referring now to FIG. 11, shown is a portion of a liquefier assembly 500 having heat sources 505 such as resistive heater blocks. Liquefier assembly 500 includes a ceramic tube 510 extending therethrough for carrying the metal or metal-alloy wire and/or liquefied metal. In order to conduct heat from the heat sources 505, liquefier assembly 500 includes a titanium insert through which the ceramic tube 510 extends. When using aluminum or an aluminum alloy as the molten metal, many materials will dissolve in the presence of the liquefied aluminum. Carbon, ceramic and titanium are three materials that do not dissolve with contact to molten aluminum, and therefore these types of materials can be used to provide a protective liner sleeve in the flow path, to contain the melt pool, to transfer heat, and serve as a barrier to protect the other heater block components.

Figure 12:
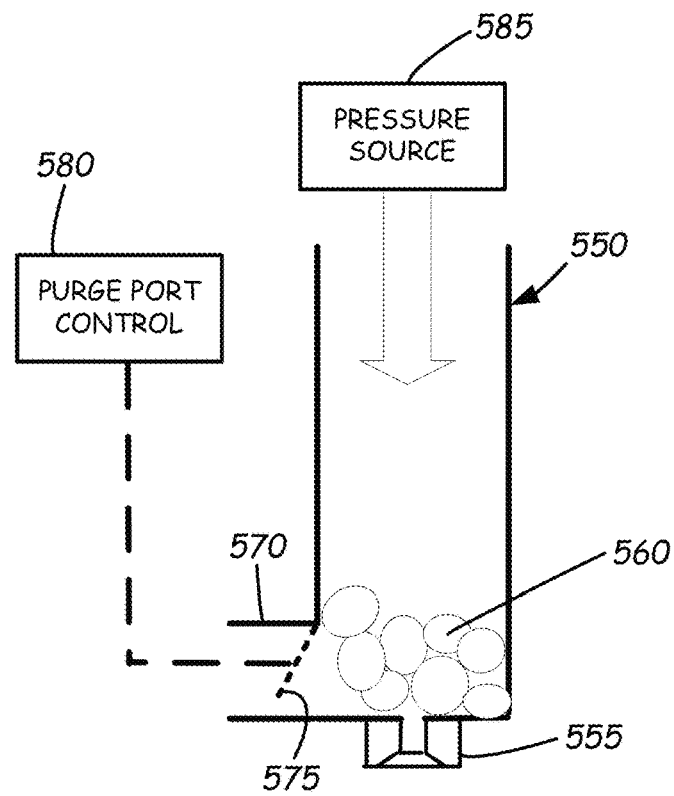
FIG. 12 is a diagrammatic illustration of a liquefier assembly embodiment which includes a purge port for purging solidified metal from the liquefier assembly.

Referring now to FIG. 12, shown is an exemplary portion of another embodiment of a liquefier assembly 550. As shown in FIG. 12, liquefier assembly 550 is in a clogged state in which solidified metal slag 560 is preventing further extrusion of liquefied metal from extrusion tip 555. In some embodiments, increasing the pressure in the liquefier assembly 550 will force the slag 560 from the extrusion nozzle. However, depending upon the amount of slag 560 clearing the liquefier assembly 550 with pressure may not be possible.

In the illustrated embodiment, liquefier assembly 550 includes a purge port 570 having a controllable valve or sealing member 575. Under the control of a purge port controller 580, which can be an electric or hydraulic controller, valve or sealing member 575 can be opened when liquefier assembly 550 is clogged such that a pressure source 585, for example of pressurized liquid or gas, can be used to force or blow out the solidified metal 560 through the purge port 570. Once the solidified metal 560 is purged from the liquefier assembly 550, purge port control 580 closes valve or sealing member 575 such that liquefier assembly 550 can again be used to extrude liquefied metal.

An alternative approach to clearing a nozzle clog would be to utilize the revolving cartridge configuration of FIG. 10, with one of the opening ports being larger than the others, so as to clear any slag or dendrites from the system.

Figure 13:
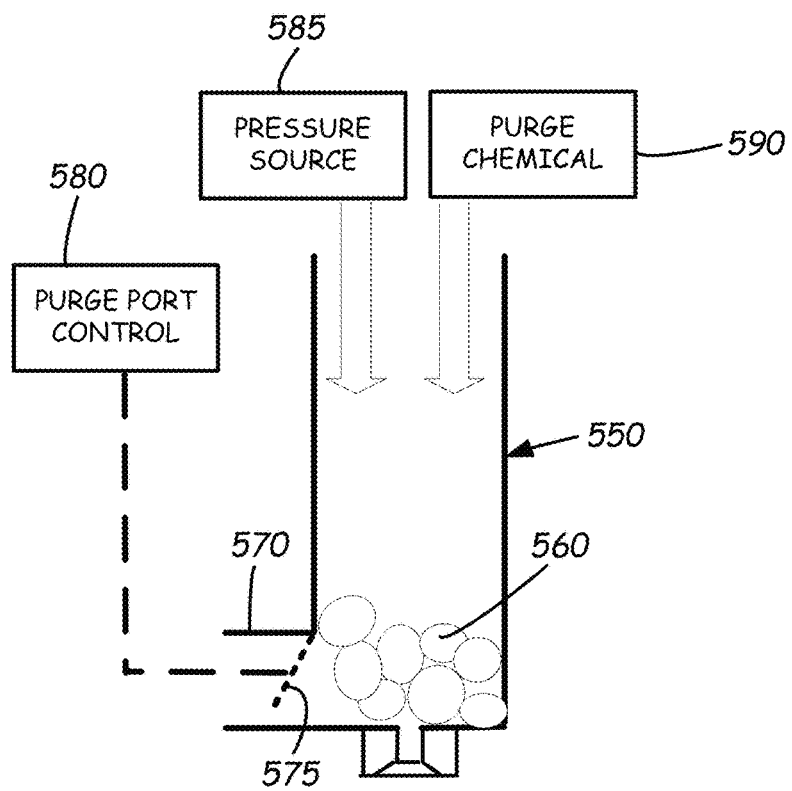
FIG. 13 is a diagrammatic illustration of a liquefier assembly such as shown in FIG. 12, and also including a solids purge mechanism.

Referring now to FIG. 13, the same liquefier assembly 550, having a purge port 570, can be used with a chemical purge mechanism 590. The chemical purge mechanism 590 can include a reservoir of a chemical material and a pump which pumps the chemical material through liquefier assembly 550 to dissolve the solidified metal 560. In some embodiments including a purge chemical mechanism, a purge port 570, a purge port control 580 and a pressure source 585 may not be necessary.

Figure 14:
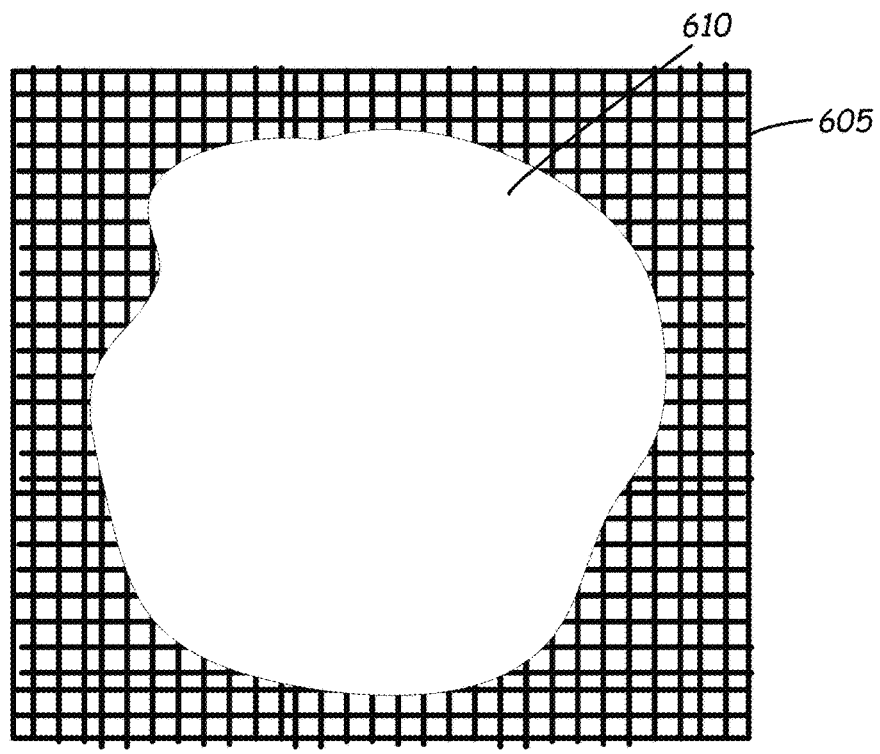
FIG. 14 is a diagrammatic illustration of a screen-like metal pre-coated substrate/build platform onto which a metal part can be printed.

Referring next to FIG. 14, shown is a first example of a build platform onto which a metal part can be printed. When using a high temperature metal such as aluminum to print a part, providing a suitable platen or build platform onto which a part can be printed by extrusion of the liquefied aluminum can be difficult. Thermoplastics and other common materials used to provide a build surface typically have a lower melting temperature than aluminum. Further, if a solid aluminum build surface is utilized, removal of the printed part from the surface can be extremely difficult, requiring extensive machining and cutting. It has been discovered that a steel mesh or screen 605 can be spattered with a thin pre-coating layer of liquefied aluminum to form a build surface 610 onto which a part can be built using liquefied aluminum extrusion. As the layer of aluminum which solidifies on screen 605 to form build surface 610 is thin, removal of an aluminum part from the build surface 610 is not difficult, and the part will typically snap off. While aluminum is described, it is understood that any metal can be spattered and layered onto the platen prior to printing with a like metal to enhance the bonding of the part to the platen.

Figure 15:
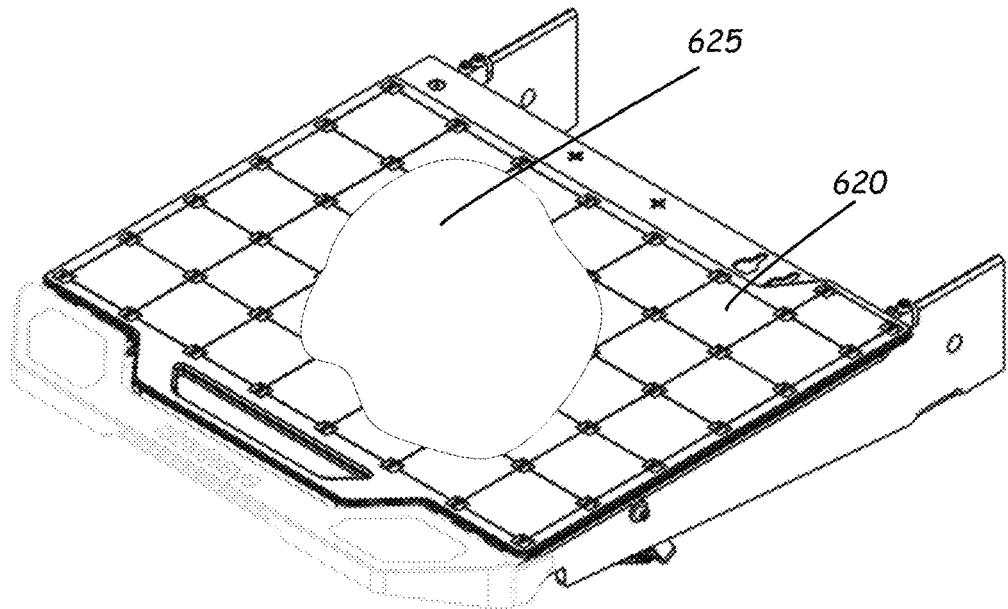
FIG. 15 is a diagrammatic illustration of another build platform onto which a metal part can be printed.

Referring now to FIG. 15, shown is a build tray or platen 620 made of a thermoplastic material. It has been found that, when using bismuth to print a part, the part will adhere well to a pre-applied thin layer of bismuth spattered on a platen. Thus, build surface 625 includes the thin splattered layer of bismuth on a thermoplastic or other platen 620. As bismuth has a melting temperature which is lower than a melting temperature of many thermoplastic materials, a well-adhering build surface 625 can be created, and a part printed on that surface, without melting the thermoplastic platen. While a plastic substrate spattered with bismuth is disclosed as an example, other disclosed embodiments are not limited to plastic substrates or to bismuth for spattering. For instance, in another example embodiment, the build surface can be formed by spraying aluminum onto a ceramic build platform. Disclosed embodiments include build surfaces and methods which incorporate the discovery that putting a small (thin) layer of the build alloy onto a substrate improves adhesion of the part during the build.

Referring now to FIG. 16, shown is a portion of a liquefier assembly 650 printing a part by extruding layers 665 of liquefied metal or metal-alloy from extrusion tip 655. The layers of the part are being deposited upon a build platen or surface 660. In 3D printers and printing systems, either the print heat (including liquefier assembly 650) is moved relative to the build platen 660, the build platen 660 is moved relative to the print head, or both are moved relative to each other. It has been found that the extrusion of liquefied metal for printing a part produces improved or optimized deposition results when the relative speed between the print head and the build platen is controlled such that the leading edge of contact between the molten bead of the currently extruding toolpath, and the underlying layer, is substantially aligned with a rear edge of the flow from extrusion tip 655. In FIG. 16, this is shown where the extruded metal 670 exiting extrusion tip 655 has a wetting contact angle V with the underlying layer and has a leading point of contact with the underlying layer at point 672. Controlling the location of this "V" spot by controlling the relative takeaway speed between the print head and the build platen produced optimized results when the speed of the print head relative to the build platen was such that point 672 is substantially aligned with rear extrusion edge 675 of extrusion tip 655. This observation was noted to be consistent with different metals used, regardless of molten metal viscosity. Utilizing this movement approach, a continuous and consistent bead of molten material was successfully deposited upon the platen, enabling the fabrication of a metal FDM part.

With some lower melt temperature metals, such as bismuth, the melt temperature is in a range such that thermoplastic support materials such as ULTEM 1010, available from Stratasys Inc., could be used in conjunction with the molten metal part, to enable the building of otherwise unprintable geometries.

Figure 17:
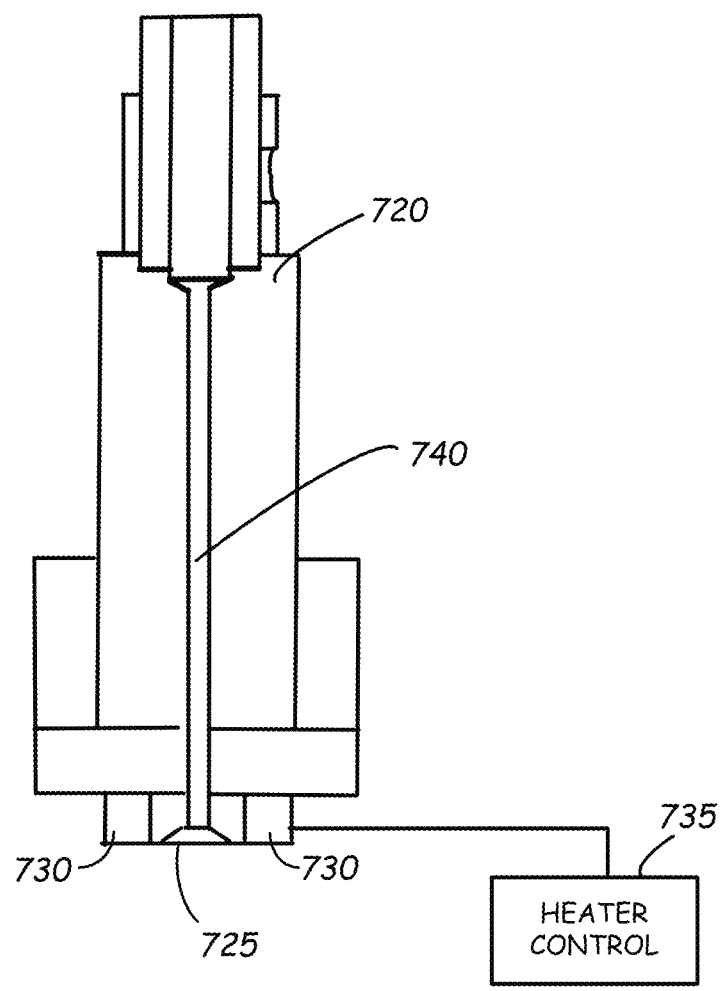
FIG. 17 is a diagrammatic illustration of a liquefier assembly in accordance with an alternate embodiment.

Referring now to FIG. 17, shown is a portion of an extruder 720 which can be used with control methods in an alternate embodiment. Extruder 720 appears for illustrative purposes to be similar to liquefier assembly 220. However, in extruder 720, instead of melting the metal wire in a melt reservoir (e.g., chamber 235 discussed above) above the extrusion tip 725, contact heater elements 730 are included and are configured to heat a center-fed spool of wire at the tip 725. The wire (not shown) is fed to extruder 720 using techniques described above, and travels to tip 725 through a feed tube 740. Heater elements 730 can be resistive or other types of heating devices, and can include a temperature sensing means, to allow control of the temperature by the heater control 735.

Using extruder 720 or a similar device configured to melt the metal or metal-alloy wire at extrusion tip 725, a deposition procedure can be implemented as follows. In a quiescent state, heater control 735 maintains the tip ring 725 thermoelectrically above liquidus for the alloy used to print a part. The feed mechanisms are controlled to maintain the alloy feed wire substantially retracted from the tip 725, and the ring is maintained such that it is not in contact with the part build surface.

To start a "road" (to begin extrusion), the tip 725 is moved to the desired start position and positioned onto the part build surface. The local region of the part build surface is then pre-heated to a temperature above melting. At this point, the wire begins feeding through the center of the tip 725 into a forming melt pool. The tip is then lifted and moved as wire is fed. Movement of the tip includes movement of the tip relative to the build surface, movement of the build surface relative to the tip, or a combination of movement of both of the tip and the build surface.

Movement of the tip relative to the build surface/part continues at a fixed distance from the part, feeding wire through the center of tip 725, to maintain a molten continuous bead between the part surface and the tip. To stop extrusion at the end of a "road", the wire is retracted away from tip 725, and the tip is lifted further off of the surface of the part or build surface. This technique uses a local region of the part build surface as the liquefier to prevent or reduce clogging within the extruder.

In the present disclosure, "3D printer", "additive manufacturing system" and the like are inclusive of both discrete 3D printers and/or toolhead accessories to manufacturing machinery which carry out an additive manufacturing sub-process within a larger process.

Although the present invention has been described with reference to preferred embodiments, workers skilled in the art will recognize that changes may be made in form and detail without departing from the spirit and scope of the invention.

The invention claimed is:

1. A method of metal extrusion for 3D printing a part from a metal filament material utilizing an additive manufacturing system, the method comprising:
   providing a build platen,
   providing a liquefier having a chamber flowably coupled to an extrusion tube terminating in an extrusion tip, the extrusion tube characterized by an L/D ratio ranging from about 4:1 to about 20:1, where L is its land length and D is its diameter;
   feeding a metal wire along a material feed path from a supply to the liquefier;
   heating the metal wire in the liquefier to form a melt pool of molten metal in the chamber, the molten metal having a viscosity, and wherein a resistance or back pressure created by the extrusion tube contains the melt pool in the chamber;
   pressurizing the chamber with an inert gas to a controlled positive pressure sufficient to force the molten metal material from the melt pool through the extrusion tube by overcoming the resistance created by the extrusion tube;
   moving the build platen and the liquefier relative to each other along toolpaths generated from a digital model while maintaining the positive pressure in the chamber and feeding the metal wire to the liquefier, such that liquidus metal will flow through the extrusion tip and onto the platen in a continuous extrusion stream such that a part may be formed by the extrusion of the liquidus metal along the toolpaths;
   providing a first electrode on the liquefier;
   providing a second electrode on the platen;
   creating a voltage between the first electrode and the second electrode to change a viscosity of the molten metal material between the liquefier and the platen;
   removing the positive pressure to stop the flow without use of further flow control mechanisms, in coordination with discontinuing the feeding of metal wire; and
   repeating the feeding, heating, pressurizing, moving, providing, creating and removing steps to form the part.

2. The method of claim 1, wherein moving the build platen and the liquefier relative to each other in a plane such that such that a leading edge of contact between a currently extruded layer and the underlying layer is substantially aligned with a rear edge of the flow from an exit port from the land length.

3. The method of claim 1, further comprising:
   placing a mesh on the platen; and
   spattering the molten metal material on the platen and the mesh to create a bonding surface for the part being printed.

4. The method of claim 1, wherein the metal wire is aluminum or an aluminum alloy.

5. The method of claim 1, further comprising cooling at least a portion the metal wire along the feed path to remove a sufficient amount of heat to prevent the wire from melting before entering the liquefier.

6. The method of claim 1, wherein D ranges from about 0.012 inches to about 0.020 inches and L ranges from about 0.048 inches to about 0.4 inches.

7. The method of claim 1, and further comprising replacing the extrusion tip by rotating a cartridge containing a plurality of extrusion tips such that a second extrusion tip is aligned with the extrusion tube.

8. A method of metal extrusion for 3D printing a part from a metal filament material utilizing an additive manufacturing system, the method comprising:
   providing a build platen,
   providing a liquefier having a chamber flowably coupled to an extrusion tube terminating in an extrusion tip, the extrusion tube characterized by an L/D ratio ranging from about 4:1 to about 20:1, where L is its land length and D is its diameter;
   feeding a metal wire along a material feed path from a supply to the liquefier;
   heating the metal wire in the liquefier to form a melt pool of molten metal in the chamber, the molten metal having a viscosity, and wherein a resistance or back pressure created by the extrusion tube contains the melt pool in the chamber;
   pressurizing the chamber with an inert gas to a range of about 2-20 psig, wherein the pressurization is sufficient to force the molten metal material from the melt pool through the extrusion tube by overcoming the resistance created by the extrusion tube;
   moving the build platen and the liquefier relative to each other along toolpaths generated from a digital model while maintaining the positive pressure in the chamber and feeding the metal wire to the liquefier, such that liquidus metal will flow through the extrusion tip and onto the platen in a continuous extrusion stream such that a part may be formed by the extrusion of the liquidus metal along the toolpaths and a leading edge of contact between a currently extruded layer and the underlying layer is substantially aligned with a rear edge of the flow from an exit port from the land length;
   removing the positive pressure to stop the flow without use of further flow control mechanisms, in coordination with discontinuing the feeding of metal wire; and
   repeating the feeding, heating, pressurizing, moving and removing steps to form the part.

9. The method of claim 8, further comprising:
placing a mesh on the platen; and
spattering the molten metal material on the platen and the mesh to create a bonding surface for the part being printed.

10. The method of claim 8, further comprising cooling at least a portion the metal wire along the feed path to remove a sufficient amount of heat to prevent the wire from melting before entering the liquefier.

11. The method of claim 10, wherein the cooling of the at least a portion of the metal wire utilizes a cryogenic gas that pressurizes the chamber.

12. The method of claim 8, wherein D ranges from about 0.012 inches to about 0.020 inches and L ranges from about 0.048 inches to about 0.4 inches.

13. The method of claim 8, and further comprising replacing the extrusion tip by rotating a cartridge containing a plurality of extrusion tips such that a second extrusion tip is aligned with the extrusion tube.

14. The method of claim 8, further comprising:
providing a first electrode on the liquefier;
providing a second electrode on the platen; and
creating a voltage between the first electrode and the second electrode to change a viscosity of the molten metal material between the liquefier and the platen.

15. The method of claim 8, wherein the metal wire is aluminum or an aluminum alloy.

16. The method of claim 8, wherein pressurizing the chamber comprising pressurizing the chamber to the range from about 5-15 psig.

* * * * *